US010022937B1

(12) United States Patent
Hou et al.

(10) Patent No.: US 10,022,937 B1
(45) Date of Patent: Jul. 17, 2018

(54) DEVICES FOR SUBSTRATE ADHESION (71) Applicant: Amazon Technologies, Inc., Reno, NV (US)

(72) Inventors: Weihsin Hou, Fremont, CA (US); Anoop Menon, Capitola, CA (US); Chin Siong Khor, Singapore (SG); Yean Chan Woon, Singapore (SG)

(73) Assignee: Amazon Technologies, Inc., Seattle, WA (US)

( * ) Notice: Subject to any disclaimer, the term of this patent is extended or adjusted under 35 U.S.C. 154(b) by 293 days.

(21) Appl. No.: 14/316,724

(22) Filed: Jun. 26, 2014

(51) Int. Cl.
*B32B 7/04* (2006.01)
*B32B 7/12* (2006.01)
*B32B 3/18* (2006.01)
*B32B 3/22* (2006.01)
*G06F 1/16* (2006.01)

(52) U.S. Cl.
CPC ............... *B32B 7/045* (2013.01); *B32B 7/12* (2013.01)

(58) Field of Classification Search
CPC ...... G09G 2300/023; Y10T 428/24612; G06F 1/1601; G06F 1/1603; B32B 7/045; B32B 7/12; B32B 3/08; B32B 3/10; B32B 3/18; B32B 3/22
USPC ................... 428/34, 188; 345/173; 361/679.21–679.26; 156/288, 381, 382
See application file for complete search history.

(56) References Cited

U.S. PATENT DOCUMENTS

| 6,803,245 | B2 * | 10/2004 | Auch | H01L 51/5246 |
| | | | | 257/E21.499 |
| 7,473,152 | B1 * | 1/2009 | Ludwig | H01J 9/261 |
| | | | | 445/25 |
| 8,540,002 | B2 * | 9/2013 | Sampica | B32B 17/10018 |
| | | | | 156/381 |
| 2011/0109590 | A1 * | 5/2011 | Park | G06F 3/0412 |
| | | | | 345/174 |
| 2012/0235953 | A1 * | 9/2012 | Kim | G06F 3/044 |
| | | | | 345/174 |
| 2012/0325402 | A1 * | 12/2012 | Suwa | B32B 37/1207 |
| | | | | 156/275.5 |

* cited by examiner

*Primary Examiner* — Joanna Pleszczynska
(74) *Attorney, Agent, or Firm* — Lee & Hayes, PLLC (57) ABSTRACT

This disclosure describes methods and devices useful for adhering a first substrate of a display to a second substrate of the display. In example embodiments, a first plate may be sealed to the first substrate, and a second plate may be sealed to the second substrate. In addition, a layer of adhesive may be disposed between the first and second substrates to assist in adhering the first substrate to the second substrate. A pressure may then be applied to the first and second plates as well as the first and second substrates to assist in the adhesion process. In example embodiments, the first plate may assist in applying pressure proximate a perimeter of the first substrate such that the perimeter of the first substrate adheres to a perimeter of the second substrate.

20 Claims, 7 Drawing Sheets

DEVICES FOR SUBSTRATE ADHESION

BACKGROUND

A large and growing population of users is enjoying entertainment through the consumption of digital content, such as music, movies, images, electronic books, and so on. The users employ various electronic devices to consume such content. Among these electronic devices are electronic book (eBook) reader devices, cellular telephones, personal digital assistants (PDAs), portable media players, tablet computers, netbooks, and the like. Such devices typically include one or more displays that are made up of two or more substrates held together with a substantially transparent adhesive. Due to dimensional variations and other imperfections associated with such substrates, however, it can be difficult to adhere these substrates. In particular, such imperfections can make it difficult to sufficiently adhere respective perimeters of two adjacent display substrates using known techniques.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, displays for electronic devices that may be used to render content. This disclosure also describes techniques for manufacturing displays for electronic devices. In example embodiments, a first substrate of the display may be joined to a substantially similar second substrate of the display via the layer of adhesive disposed between the two substrates. Additionally, components of a fixture may be disposed on both the first and second substrates, and a pressure may be applied to at least the first and second substrates and the fixture. In some embodiments, the components of the fixture may be configured to apply a localized pressure to one or more locations on the first and second substrates. As a result, the components of the fixture may assist in improving adhesion of the first and second substrates at the locations in which the localized pressure is applied.

For example, while the methods and devices of the present disclosure may be employed to assist in adhering any of a number of different types of substrates, the first substrate described above may comprise a layer of cover glass associated with the display, and the second substrate described above may comprise a substrate utilized to support one or more transistors, electrodes, or other like components of the display. In such an example, a layer of optically clear adhesive may be disposed between the first and second substrates in order to adhere the first substrate to the second substrate. While such adhesive may substantially adhere respective middle portions of the first and second substrates once an external pressure is applied thereto, the perimeters of adjacent surfaces of the first and second substrates may not sufficiently adhere without further processing. The difficulty associated with adhering the perimeters of such adjacent surfaces may be caused by a number of factors including variations in the dimensions of the first and second substrates.

In an example embodiment, the fixture may include a first plate having a spacer configured to form a substantially fluid-tight seal with a top surface of the first substrate. The fixture may also include a second plate having a spacer configured to form a substantially fluid-tight seal with a bottom surface of the second substrate. Upon forming such seals, a first gap be formed between the first plate and the first substrate, and a second gap may be formed between the second plate and the second substrate. A first pressure may then be applied to the first and second plates, and to at least a portion of the first and second substrates. In example embodiments, such a first pressure may be applied by, for example, an autoclave or other like device configured to apply a substantially uniform positive pressure to articles disposed therein. In such embodiments, the first pressure may be applied to, for example, respective perimeters of the first and second substrates by the first and second plates sealed thereto. In particular, the first pressure may be applied to the perimeter of the top surface of the first substrate by the spacer of the first plate. Likewise, the first pressure may be applied to the perimeter of the bottom surface of the second substrate by the spacer of the second plate. However, while the first pressure is applied, a second pressure within at least one of the gaps described above may remain substantially constant due to the substantially fluid-tight seals formed by the spacers. For example, the second pressure within at least one of the gaps may be less than the first pressure applied to the perimeters of the first and second substrates. The localized pressure applied to the first and second substrates by the first and second plates may improve adhesion at the perimeters of the first and second substrates.

Accordingly, example methods and devices of the present disclosure may assist in adhering at least the respective perimeters of two adjacent substrates of an example display. Example embodiments of the present disclosure will now be described with respect to FIGS. 1-5.

Figure 1:
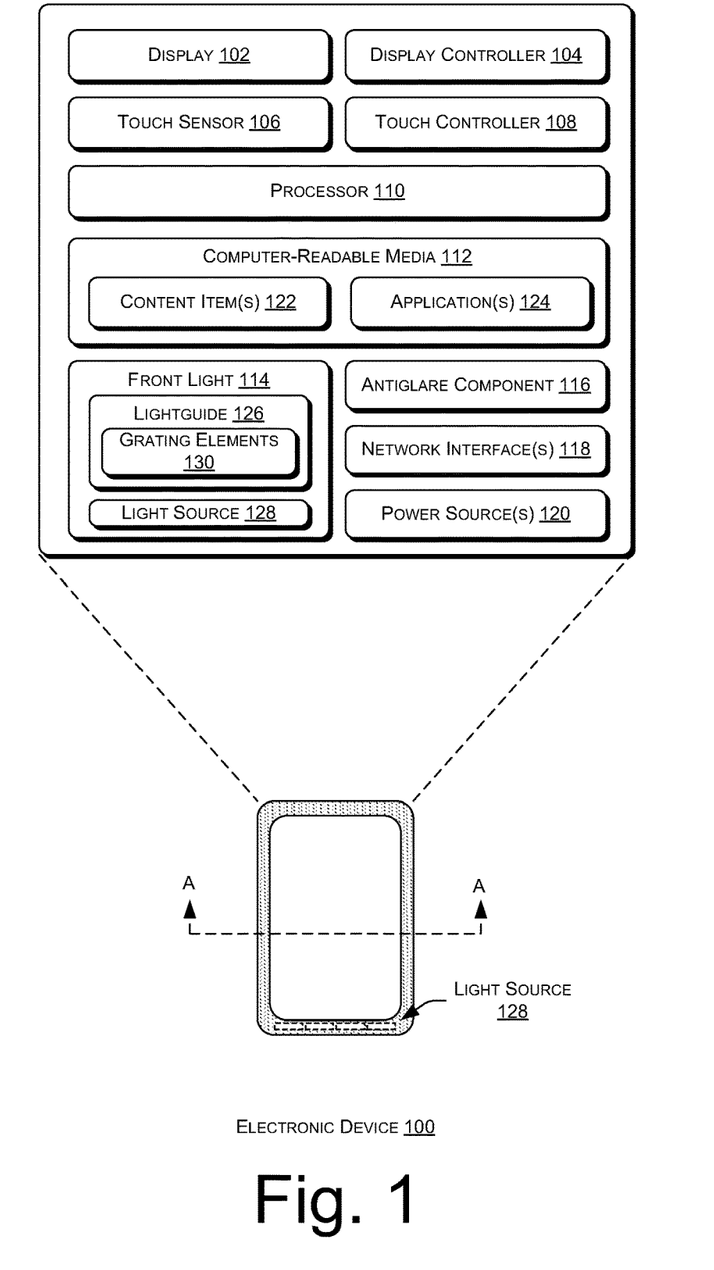
FIG. 1 illustrates an example electronic device that includes a display.

FIG. 1 illustrates an example electronic device 100 of the present disclosure. The device 100 may comprise any type of mobile electronic device (e.g., an electronic book reader, a tablet computing device, a laptop computer, a multifunction communication device, a portable digital assistant (PDA), etc.) or non-mobile electronic device (e.g., a desktop computer, a television, etc.). In addition, while FIG. 1 illustrates several example components of the electronic device 100, it is to be appreciated that the device 100 may also include other conventional components, such as an operating system, system busses, input/output components, and the like.

Regardless of the specific implementation of the electronic device 100, the device 100 includes a display 102 and a corresponding display controller 104. In example embodiments, the device 100 may also include one or more of a touch sensor 106, a touch controller 108, a processor 110, a computer-readable media 112, a front light 114, antiglare components 116, network interfaces 118, and one or more power sources 120. In some embodiments, the computer-readable media 112 may include one or more content items 122 and/or applications 124. Additionally, in some embodiments the front light 114 may include a light guide 126, a light source 128, and/or one or more grating elements 130. The device 100, and the components shown in FIG. 1, will be discussed in greater detail below.

Figure 2:
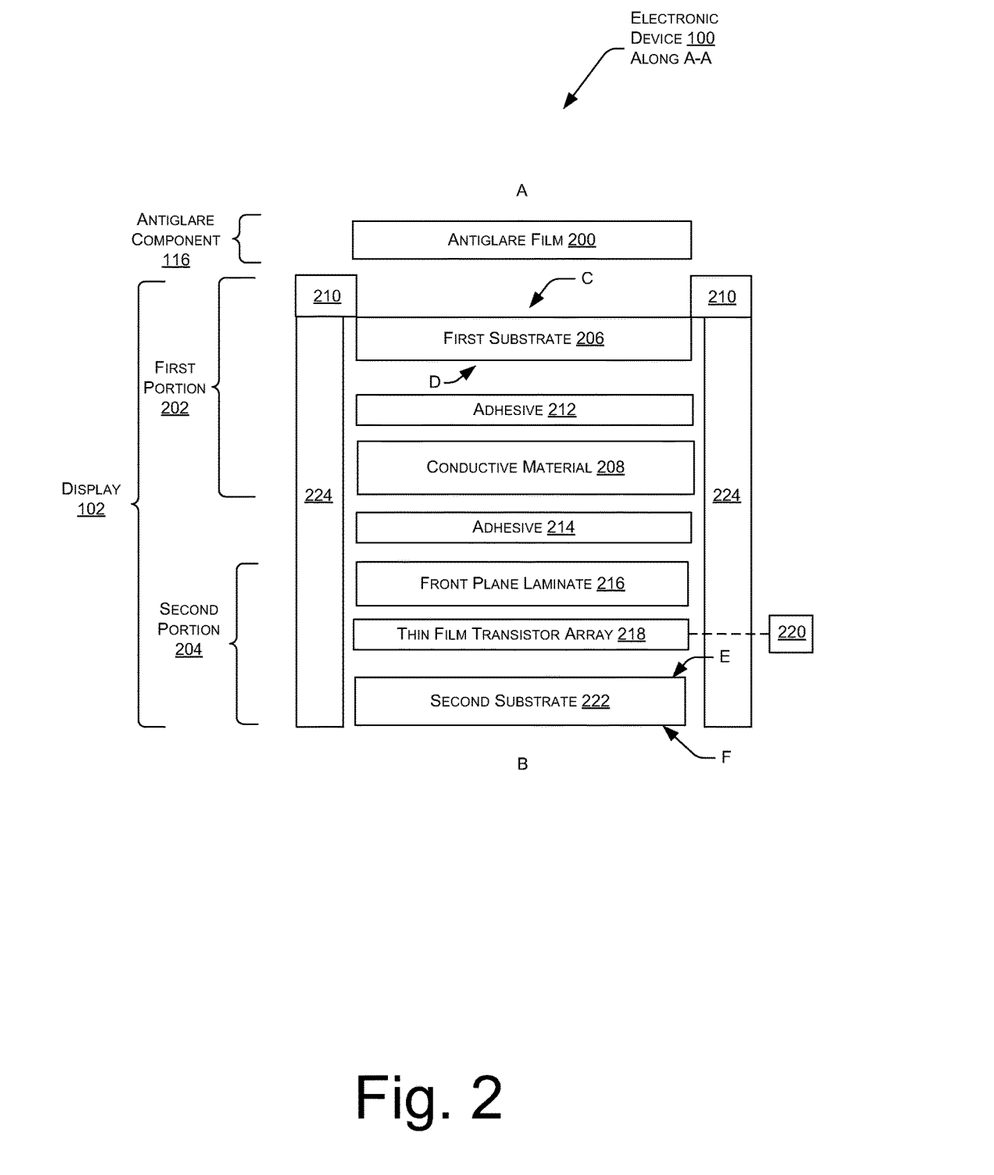
FIG. 2 illustrates an example schematic cross-section of a display stack of the electronic device of FIG. 1.

FIG. 2 illustrates a first example of a schematic cross-section of the electronic device 100 along the line A-A from FIG. 1. The cross-section shown in FIG. 2 illustrates an antiglare film 200 of the antiglare component 116 residing atop the display 102. It is understood that the touch sensor 106, the front light 114, an external housing of the electronic device 100, and other components of the electronic device 100 have been omitted from FIG. 2 for clarity, and the example partial cross-section illustrated in FIG. 2 should not be interpreted as limiting the present disclosure. Additionally, the partial cross-section shown in FIG. 2 is intended to be schematic in nature, and the spaces between the various components shown in FIG. 2 are shown merely for ease of illustration.

Further, FIG. 2 illustrates a location A external to the electronic device 100 and a location B internal to the electronic device 100. Accordingly, a first component of the display 100 described herein as residing "atop" or "above" a second component may be disposed closer to the location A than the secondary component. Likewise, a first component of the display 102 described herein as residing "beneath" or "below" a second component may be disposed closer to the location B than the second component. Additionally, the location A may correspond to and/or may be indicative of a location of a user of the device 100 as content items are shown on the display 102 and/or otherwise consumed by the user. In example embodiments, content items shown on the display 102 may be viewed by the user of the device 100 located at position A. Thus, surfaces or other portions of the components of the display 102 described herein as being "outwardly-facing" may be disposed facing the location A, while such components described herein as being "inwardly-facing" may be disposed facing the location B.

As illustrated in FIG. 2, in this example the display 102 includes a first portion 202 and a second portion 204. The first and second portions 202, 204 may be manufactured separately, and may be connected during assembly and/or manufacture of the display 102. For example, the first portion 202 may comprise a first plurality of components of the display 102 that are joined, adhered, fused, laminated, coupled, sputtered, welded, soldered, bonded, wired, and/or otherwise "connected" together during manufacture of the first portion 202, such as by mechanical, electrical, chemical, wireless, networked, communicative, and/or other known methods. Additionally, the second portion 204 may comprise a second plurality of components of the display 102 that are connected together during manufacture of the second portion 204. Such configurations may simplify the assembly and/or manufacture of the display 102.

As shown in FIG. 2, the first portion 202 of the display 102 may comprise a first substantially transparent substrate 206 and a layer of conductive material 208 connected to the first substrate 206. The display 102 may also include a non-transparent mask 210, and at least one layer of adhesive 212. It is understood that "transparent" components of the device 100 may substantially permit the passage of visible light therethrough, while "non-transparent" components of the device 100 may substantially block the passage of visible light therethrough.

In some embodiments, the adhesive 212 may be disposed between the first substrate 206 and the conductive material 208, and the adhesive 212 may be configured to adhere the conductive material 208 to the first substrate 206. Additionally, the non-transparent mask 210 may be disposed on and/or adjacent to the first substrate 206. In some embodiments, the mask 210 may be positioned in order to block one or more components of the display 102 from view by a user at location A.

As shown in FIG. 2, the first transparent substrate 206 may include an upper or top surface C and a lower or bottom surface D opposite the top surface C. The top surface C may be disposed facing the location A external to the electronic device 100 and the bottom surface D may be disposed facing the location B internal to the electronic device 100. In such embodiments, the top surface C may comprise an outward-most surface of the display 102 relative to the electronic device 100. Accordingly, the top surface C may be an external surface of the display 102 and/or of the electronic device 100 in which the display 102 is used. As such, the top surface C may be disposed closer to the location A external to the electronic device 100 than any other portion, section, or component of the display 102. Additionally, the majority of the top surface C may face the location A external to the electronic device 100 in embodiments in which a perimeter or other relatively small portion of the top surface C is at least partially covered by, for example, one or more brackets, clamps, shoulders, notches, housings, or other like components of the electronic device 100. In embodiments of the present disclosure, the top surface C may comprise a viewing pane of the first substrate 206, and a user of the electronic device 100 may view the bottom surface D (to the extent possible) and/or other components of the display 102 through the top surface C. For example, content items shown on the display 100 may be visible by the user via the top surface C.

Further, as shown in FIG. 2, the first portion 202 may be connected to the second portion 204 via a layer of adhesive 214 disposed therebetween. For example, the second portion 204 may include a front plane laminate (FPL) 216, a thin film transistor (TFT) array 218, and a flexible printed circuit board (PCB) 220 connected to one or more electrodes of the TFT array 218. In such embodiments, the PCB 220 may be disposed adjacent to the TFT array 218 in order to facilitate connecting the PCB 220 to the TFT array 218. The second portion 204 may further include a second substantially transparent substrate 222, and one or more of the FPL 216 and the TFT array 218 may be disposed on and/or otherwise supported by the second substrate 222. The second substrate 222 may include a first (i.e., a top or upper) surface E and a second (i.e., a bottom or lower) surface F opposite the first surface E. In such embodiments, the TFT array 218 may be connected to the first surface E of the second substrate 222. Likewise, the FPL 216 may be connected to the TFT array 218 via a layer of adhesive (not shown) disposed between the TFT array 218 and the FPL 216. Alternatively, the FPL 216 may be applied to the TFT array 218, in any known manner, while the FPL 216 is in liquid form.

In an example embodiment, the FPL 216 may include a plurality of capsules, each containing liquid subject to electrowetting activation. For example, voltage may be applied to the TFT array 218 to change the position of particles within each capsule. Such particles may assist in displaying portions of a content item on the display 102. The display 102 may also include one or more layers of edge glue 224 and/or other like materials disposed around and/or on the corners, perimeters, and/or edges of the components of the display 102. Such edge glue 224 be similar to the adhesive 212, 214 described above and may be cured to the components of the display 102 to create a humidity barrier around such components, thereby increasing the efficacy of the display 102.

With reference to the first portion 202 of the example display 102 illustrated in FIG. 2, the first substrate 206 may be made from any substantially transparent, substantially rigid, substantially non-conductive material known in the art. In some embodiments, the first substrate 206 may be made from glass or any other like substrate material commonly used in electronic devices 100. For example, the first substrate 206 may comprise a transparent glass substrate commonly referred to as "cover glass" in known electronic devices 100. The first substrate 206 may have a thickness of approximately 0.7 mm or less, and may be reinforced through chemical, mechanical, and or other known processes during the manufacture thereof. In exemplary embodiments, the first substrate 206 may have a substantially uniform thickness and the top and bottom surfaces C, D thereof may be substantially planar surfaces. Accordingly, the top surface C may be substantially parallel to the bottom surface D, and the top surface C may comprise an external surface of the electronic device 100.

The conductive material 208 connected to the first substrate 206 may comprise a thin, substantially planar, substantially transparent film or substrate made from any conductive material known in the art. For example, the conductive material 208 may be made from indium tin oxide (ITO), or other like transparent metals or alloys. Additionally, the conductive material 208 may be connected to electrical ground, and may comprise a common electrode of the display 102. For example, the conductive material 208, together with the TFT array 218, may be operable as a capacitor of the display 102. In such an embodiment, electrical current directed to the conductive material 208 by, for example, the TFT array 218 may be directed to ground by the conductive material 208.

In example embodiment, the conductive material 208 may be adhered to the surface D of the first substrate 206 with liquid and/or solid adhesive 212. In such embodiments, a layer of adhesive 214 may also connect, for example, the first portion 202 to the second portion 204. For example, the adhesive 214 may adhere the first substrate 206 to the second substrate 222 and, in particular, the adhesive 214 may adhere the layer of conductive material 208 disposed on the first substrate 206 to the FPL 216 and/or the TFT array 218 disposed on the second substrate 222. In such embodiments, example methods of the present disclosure may be employed to substantially eliminate the opportunity for air bubbles to form in the adhesive 214 between the first portion 202 and the second portion 204 of the display 102. As is known, such air bubbles may hinder the performance of the resulting display 102. Additionally, example methods of the present disclosure may be employed to assist in adhering a perimeter of the first substrate to a perimeter of the second substrate 222.

During assembly, liquid adhesive 214 may be deposited onto the conductive material 208, the FPL 216, and/or the TFT array 218. When the liquid adhesive 214 reaches the corners of such components, the corners may be UV-cured. Thereafter, liquid adhesive 214 on the remaining portion of the conductive material 208, the FPL 216, and/or the TFT array 218 may be UV-cured. While this example includes liquid adhesive 214, in other instances the liquid adhesive 214 may be replaced with a solid adhesive 214. In either instance, the adhesive 214 may be formed from an acrylic material and/or, in some instances, from silicone. For instance, the adhesive 214 may comprise Loctite® 5192 and/or MSDS made by Nalax3®. The MSDS comprises UV-curable polyurethane acrylates based a formulation comprising of hexamethylene diacrylate, Urethane acrykate oligomer, Acyrlate ester and photoinitator. This formulation may achieve balanced coating properties such as tensile properties, hardness, weatherability, and adhesion. In some embodiments, the adhesive 214 may be created by applying the formulation to PMMA rolls using a wet coating method immediately followed by embossing and UV curing (e.g., using a Fusion lamp).

The non-transparent mask 210 shown in FIG. 2 may comprise, for example, white tape, black tape, and/or any other type of light-diffusing, reflective, or light-absorbing coating. For example, such a non-transparent mask 210 may be laid along and/or proximate to a perimeter of the first substrate 206. Although illustrated as being connected to the top surface C of the first substrate 206 in FIG. 2, in additional embodiments, the non-transparent mask 210 may be connected to the bottom surface D.

In some instances, the electronic device 100 may also include a bezel, either atop, beneath, or in lieu of the non-transparent mask 210. In either instance, the bezel may be optically connected to the other components of the display 102 and/or to the antiglare component 116. The bezel may function to absorb stray ambient light and may therefore enhance the user experience. To absorb light in this manner, in some instances the bezel may be black or another dark color. Additionally or alternatively, the non-transparent mask 210 may include black or dark glue, ink, paint, marker, adhesive, or other like materials around the edges of the first substrate 206 and/or other components of the display 102 to similarly reduce reflections off of the edges of the various components of the display 102 (i.e., to reduce the amount of light that escapes).

In some instances, the top-most surface of the display 102 (e.g., a surface of the antiglare component 116 in this implementation) may be treated to provide a particular feel or roughness, such as a feel or roughness that substantially approximates that of paper or that otherwise enhances a feel of the device. In some instances, the top surface is etched, abraded, polished or otherwise treated to provide this feel or roughness.

With reference to the second portion 204 of the example display 102 illustrated in FIG. 2, the TFT array 218 may comprise a plurality of conductive electrodes and may be made from any substantially transparent or non-transparent conductive material known in the art. For example, such electrodes may be made from at least one of ITO, carbon nanotubes, silver nanowire, and/or any other known transparent conductive material. Alternatively, such electrodes may be made from copper, gold, or other known non-transparent conducive materials.

In an example embodiment, the electrodes of the TFT array 218 may overlap and/or intersect in any known fashion in order to form a plurality of nodes of the display 102. In such embodiments, at least one electrode of the TFT array 218 may be connected to the top surface E of the second substrate 222. In further embodiments, each electrode of the TFT array 218 may be connected to the top surface E. For example, during manufacture of the second portion 204 of the display 102, the electrodes may be connected to the top surface E via any known sputtering process or other like technique.

As shown schematically in FIG. 2, each electrode of the TFT array 218 may be connected to the flexible PCB 220 described above. In exemplary embodiments, the PCB 220 may include the display controller 104 and/or other components of the electronic device 100 configured to control display of one or more content items on the display 102. For example, the display controller 104 may be mounted to and/or otherwise connected to the PCB 220. In such embodiments, the display controller 104 and/or other components of the PCB 220 may direct electrical current to the electrodes of the TFT array 218 at any desired voltage. Further, the electrical current directed to the electrodes may produce a desired polarity at each individual node formed by the electrodes. In particular, the polarity at each individual node of the TFT array 218 may be controlled to assist in controlling display of a content item on the display 102. In such embodiments, the display controller 104 and/or other components of the PCB 220 may be configured to selectively vary and/or otherwise control the polarity at each node.

The FPL 216 described above may include a plurality of charged particles (not shown), and each of the charged particles may be movably disposed within the FPL 216. For example, each of the charged particles may be movable relative to the TFT array 218, the conductive material 208, and/or other components of the display 102. Such movement may be in a direction toward the location A external to the electronic device 100 and/or toward the location B internal to the electronic device 100. Alternatively, such movement may be in additional directions, such as directions into or out of the page, or other directions useful in displaying content on the display 102.

In embodiments of the present disclosure, the FPL 216 described herein may comprise any film, laminate, or other like material including one or more components moveable within and/or relative to the material in response to an electrical charge. In example embodiments, the FPL 216 may include at least one substantially transparent, substantially hollow capsule (not shown). In such embodiments, a plurality of charged particles may be movably disposed within each capsule of the FPL 216. In such embodiments, each capsule of the FPL 216 may be disposed at a respective fixed location within the FPL 216. Alternatively, in additional exemplary embodiments, one or more of the capsules may be movably disposed within the FPL 216. In any of the embodiments described herein, one or more capsules of the FPL 216 may "correspond" to a single node of the TFT array 218. Such capsules 308 may correspond to a respective node by nature of being disposed substantially directly beneath the respective node. For example, in such embodiments a polar and/or other magnetic axis (not shown) of the respective node may extend substantially collinear with a central axis (not shown) of the corresponding capsule.

In any of the embodiments described herein, the electrodes of the TFT array 218 may be operable to drive movement of at least one of the charged particles at each respective node by selectively varying the polarity at each node. It is understood that the FPL 216 is visible through the first substrate 206 and the layer of conductive material. For example, a user of the electronic device 100 may view the charged particles of the FPL 216, from the location A external to the device 100, through the top surface C of the first substrate 206.

The second substrate 222 may be substantially similar to the first substrate 206 described above. For example, the second substrate 222 may be made from any substantially transparent, substantially rigid, substantially non-conductive material known in the art. In some embodiments, the second substrate 222 may be made from glass or any other like substrate material commonly used in electronic devices 100. For example, the second substrate 222 may comprise a transparent glass substrate commonly referred to as the "TFT substrate" in known electronic devices 100. The second substrate 222 may have a thickness of approximately 0.7 mm or less, and may be reinforced through chemical, mechanical, and or other known processes during the manufacture thereof. In exemplary embodiments, the second substrate 222 may have a substantially uniform thickness, and the top and bottom surfaces E, F thereof may be substantially planar surfaces. Accordingly, the top surface E may be substantially parallel to the bottom surface F.

While FIG. 2 illustrates an example display 102 or "display stack," other implementations may utilize the same or different components in the same or different orders. For instance, one implementation may include the touch sensor 106 (FIG. 1) on top of the first substrate 206 (with or without the antiglare component 116), such as on the surface C, or on the bottom of the first substrate 206, such as on the surface D. In a further implementation, the touch sensor 106 may be integrated with the antiglare component 116 on the top surface C of the first substrate 206. Additionally, the frontlight 114 may reside under the touch sensor 106, with the display 102 residing underneath the frontlight 114. Furthermore, in some examples, the device 100 may not include a frontlight 114.

Figure 3:
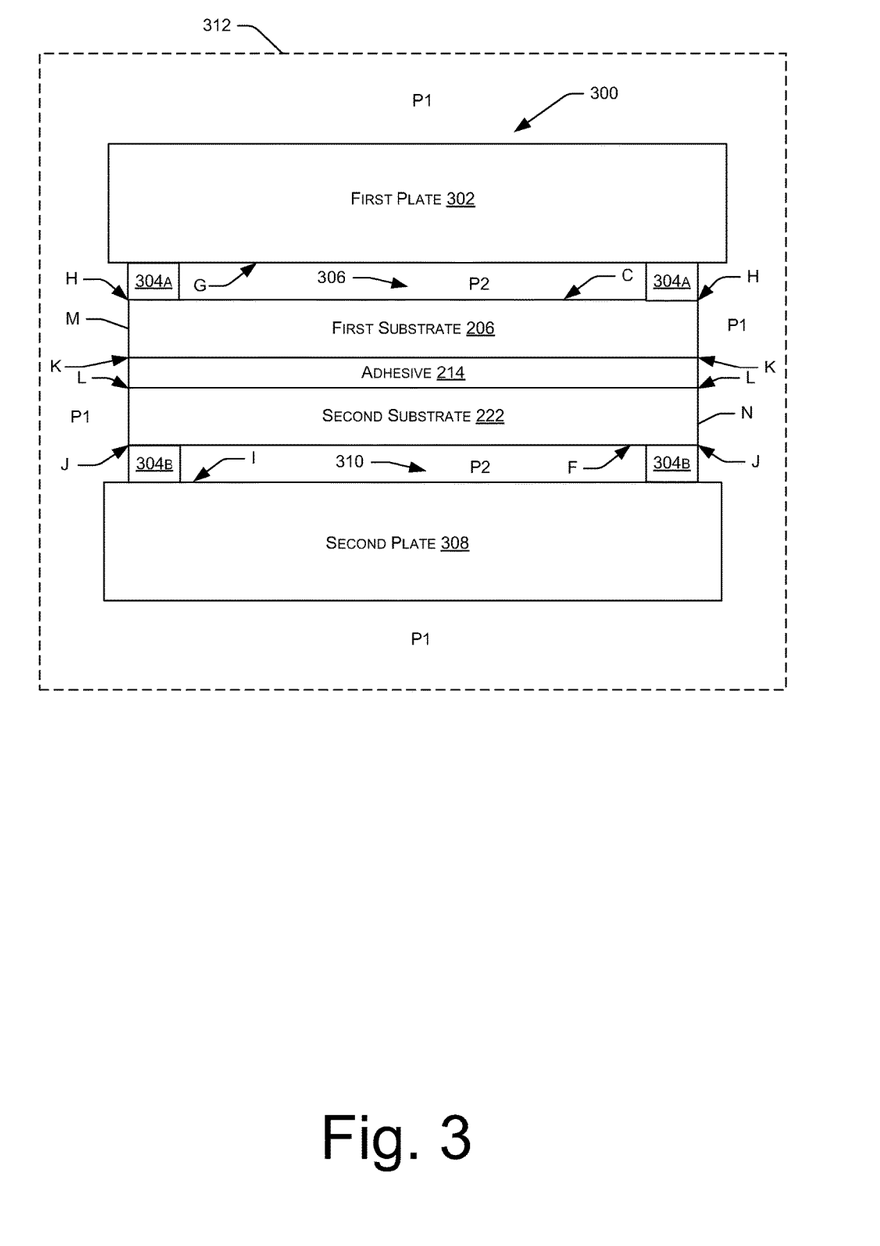
FIG. 3 illustrates an example schematic cross-section of a portion of a display with first and second plates mounted on first and second substrates of the display.
Figure 4:
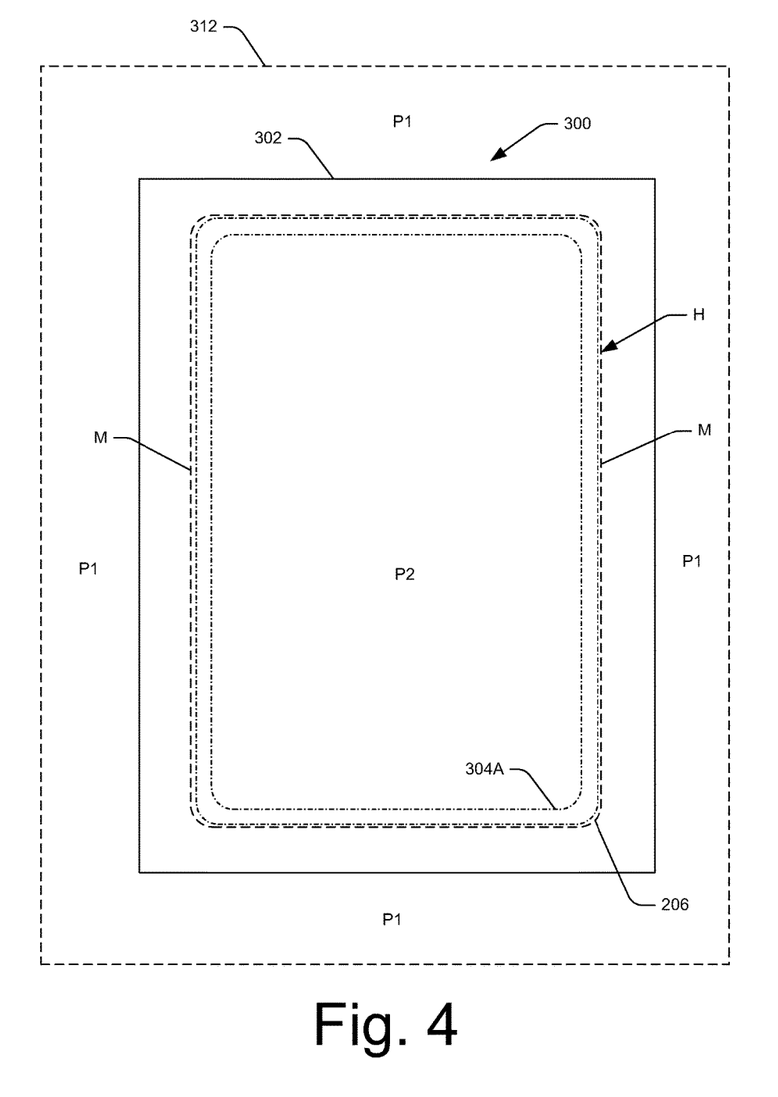
FIG. 4 illustrates an example plan view of a portion of a display.

FIGS. 3 and 4 illustrate an example fixture 300 configured to assist in assembling, forming, and/or otherwise manufacturing an example display 102 of the present disclosure. FIG. 3 illustrates a partial cross-sectional view of the display 102 described above, with various components removed for clarity. Additionally, FIG. 4 illustrates a partial plan view of the display 102 with various components removed for clarity. While FIG. 3 illustrates the first substrate 206, the second substrate 222, and the adhesive 214 without, for example, the adhesive 212, conductive material 208, FPL 216, TFT array 218, and other components of the display 102 described above with respect to FIG. 2, these components have been omitted from FIG. 3 (and from FIG. 4) for ease of discussion, and this omission should not be construed as limiting the present disclosure in any way.

As shown in FIG. 3, an example fixture 300 may include, among other things, a first substantially rigid plate 302 having one or more substantially flexible spacers 304A. In an example embodiment, the first plate 302 may comprise a substantially planar structure configured to maintain a substantially constant shape, size, dimension, and/or other configuration upon being subjected to varying pressures for extended periods of time. Additionally, first plate 302 may be configured to maintain a substantially constant shape, size, dimension, and/or other configuration upon being subjected to varying temperatures for extended periods of time. In example embodiments, the first plate 302 may be made from any known material such as, for example, metals, alloys, glass, ceramics, or other like materials known to withstand, for example, elevated temperatures and/or pressures without fatigue or failure. Additionally, the first plate 302 may have any desirable length, width, height, thickness, and/or other like dimension in order to maintain a sufficient rigidity for applications of the present disclosure. Further, it is understood that such dimensions may vary depending on the material used to manufacture the first plate 302. Such dimension may also substantially correspond to corresponding dimensions of the first substrate 206.

As shown in FIG. 3, the first plate 302 may include a substantially planar surface G, and in some embodiments the one or more spacers 304A may be connected to the surface G. The one or more spacers 304A may be configured to seal the first plate 302 to the first substrate 206. In particular, a spacer 304A may be configured to form a substantially fluid-tight seal between the first plate 302 and the top surface C of the first substrate 206.

The one or more spacers 304A may be formed from any of the materials described above with regard to the first plate 302. Additionally, and/or alternatively, a spacer 304A may be formed from one or more different materials than those described above with respect to the first plate 302. For example, the spacer 304A may comprise a substantially flexible and/or malleable material having any durometer or other like property convenient for forming a substantially fluid-tight seal through contact with the top surface C of the first substrate 206. Such materials may include, for example, any known rubber, plastic, polymer, or other like material. In some embodiments, a plurality of spacers 304A may be connected to the surface G of the first plate 302 in order to facilitate forming a substantially fluid-tight seal between the first plate 302 and the first substrate 206. Alternatively, a single spacer 304A may be connected to the first plate 302 to form such a seal. An example single spacer 304A may resemble and O-ring, gasket, or other like continuous sealing structure, and such an example single spacer 304A is illustrated in greater detail in FIG. 4. In embodiments in which such a single spacer 304A is employed, the spacer 304A may be a continuous spacer having a rectangular, square, oval, circular, and/or any other shape substantially matching the shape of a perimeter of the surface of the substrate 206 to which the spacer 304A is sealed. Such a configuration may enable the spacer 304A to capture air and/or other fluids in a sealed region defined by the spacer 304A, the surface of the substrate 206, and the surface G of the first plate 302 from which the spacer 304A extends. Such example sealed regions or "gaps" will be described in greater detail below. Additionally, in further embodiments more than one spacer 304A may be arranged on the surface G and/or otherwise configured such that, together, multiple spacers 304A may form and/or otherwise define a single sealed region or "gap". The spacers 304A described herein may be adhered to, formed integrally with, press fit, and/or otherwise connected to the surface G in any known way so as to facilitate forming a substantially fluid-tight seal with the top surface C.

As shown in FIG. 3, the height, thickness, diameter, and/or other configuration of the spacer 304A may separate the first plate 302 from the first substrate 206. For example, when the first plate 302 is sealed to the first substrate 206, the spacer 304A may assist in forming at least a portion of a sealed region or gap 306 between the surface G of the first plate 302 and the top surface C of the first substrate 206. As shown in FIG. 3, an example gap 306 may extend from the surface G to the top surface C. The gap 306 may also extend along a lateral width of the first plate 302 and the first substrate 206, such as between surfaces of the spacer 304A. In particular, the spacer 304A, a portion of the surface G of the first plate 302, and the upper or top surface C of the first substrate 206 together define the sealed region or gap 306. Additionally, as the spacer 304A is sealed to the surface C of the first substrate 206, air or other like fluids may be captured within the gap 306 at any known pressure.

In an example embodiment, a length, width, height, and/or other dimension of the first plate 302 may be greater than or substantially equal to a corresponding dimension of the first substrate 206. In such embodiments, the spacer 304A may be disposed on the surface G and/or otherwise positioned relative to the first plate 302 and the first substrate 206 such that the spacer 304A may be positioned proximate a perimeter H of the top surface C of the first substrate 206 when the first plate 302 is sealed to the first substrate 206. Such an example perimeter H of the top surface C is shown in FIG. 4.

For example, when the first plate 302 is sealed to the first substrate 206, the spacer 304A may be disposed adjacent to and/or may at least partially overlay the perimeter H of the top surface C. Positioning the spacer 304A in this way may assist in, for example, applying a localized pressure to the first substrate 206. In particular, the spacer 304A may be positioned to apply a desired pressure to the first substrate 206 proximate the perimeter H of the top surface C. As will be described in greater detail below, applying such a localized pressure proximate the perimeter H of the top surface C may assist in adhering a perimeter of the first substrate 206 to a perimeter of the second substrate 222.

In an example embodiment, the fixture 300 may also include a second plate 308 having one or more spacers 304B. In example embodiments, the second plate 308 may have substantially the same configuration as the first plate 302, and the one or more spacers 304B of the second plate 308 may have substantially the same configuration as the one or more spacers 304A of the first plate 302. For example, the second plate 308 may comprise a substantially planar structure configured to maintain a substantially constant shape, size, dimension, and/or other configuration upon being subjected to elevated, reduced, and/or varying temperatures and/or pressures for extended periods of time. In example embodiments, the second plate 308 may be made from any desirable material such as, for example, metals, alloys, glass, ceramics, or other like materials described above with respect to the first plate 302.

Additionally, the second plate 308 may include a substantially planar surface I, and in some embodiments the one or more spacers 304B may be connected to the surface I. The one or more spacers 304B may be configured to seal the second plate 308 to the second substrate 222. In particular, a spacer 304B may be configured to form a substantially fluid-tight seal between the second plate 308 and the bottom surface F of the second substrate 222. The one or more spacers 304B may be made from any of the materials described above with respect to the one or more spacers 304A of the first plate 302.

Additionally, the height, thickness, diameter, and/or other configuration of the spacer 304B may separate the second plate 308 from the second substrate 222. For example, when the second plate 308 is sealed to the second substrate 222, the spacer 304B may assist in forming at least a portion of a sealed region or gap 310 between the surface I of the second plate 308 and the bottom surface F of the second substrate 222. As shown in FIG. 3, an example gap 310 may extend from the surface I to the bottom surface F. The gap 310 may also extend along a lateral width of the second plate 308 and the second substrate 222, such as between surfaces of the spacer 304B. In particular, the spacer 304B, a portion of the surface I of the second plate 308, and the lower or bottom surface F of the second substrate 222 together define the sealed region or gap 310. Additionally, as the spacer 304B is sealed to the surface F of the second substrate 222, air or other like fluids may be captured within the gap 310 at any known pressure.

In an example embodiment, a length, width, height, and/or other dimension of the second plate 308 may be greater than or substantially equal to a corresponding dimension of the second substrate 222. In such embodiments, the spacer 304B may be disposed on the surface I and/or otherwise positioned relative to the second plate 308 and the second substrate 222 such that the spacer 304B may be positioned proximate a perimeter J of the bottom surface F of the second substrate 222 when the second plate 308 is sealed to the second substrate 222. In addition, similar to the spacer 304A described above, the spacer 304B may be positioned to apply a desired pressure to the second substrate 222 proximate the perimeter J of the bottom surface F, and applying such a localized pressure proximate the perimeter J of the bottom surface F may assist in adhering a perimeter of the second substrate 222 to a perimeter of the first substrate 206.

With continued reference to FIGS. 3 and 4, in an example embodiment the fixture 300 may be sealed to one or more components of the display 102. The fixture 300, together with such components of the display 102, may then be disposed within a device 312 configured to apply a first pressure P1 to the first plate 302, the second plate 308, and at least a portion of the various components of the display 102. For example, the first plate 302 may be sealed to the first substrate 206, the second plate 308 may be sealed to the second substrate 222, a layer of adhesive 214 may be disposed between the first and second substrates 206, 222, and together, each of these components may be disposed within the device 312 for further treatment. In an example embodiment, the device 312 may comprise an autoclave or other known device configured to apply a positive first air or other like fluid pressure P1 to display components disposed therein. In such embodiments, the positive first pressure P1 may be applied substantially uniformly to the display components disposed within the device 312. Alternatively, in additional embodiments the device 312 may comprise a vacuum chamber or other known device configured to apply a negative first air or other like fluid pressure P1 to display components disposed therein. It is understood that such a negative first pressure P1 may also be applied substantially uniformly to the display components disposed within the device 312. In example embodiments, the bottom surface D (FIG. 2) of the first substrate 206 may include a perimeter K and the top surface E (FIG. 2) of the second substrate 222 may include a perimeter L. Additionally, the first substrate 206 may include a side M extending substantially from the top surface C to the bottom surface D, and the second substrate 222 may include a side N extending substantially from the top surface E to the bottom surface F. In such embodiments, the pressure P1 applied by the device 312 may be applied to at least a portion of the sides M, N of the first and second substrates 206, 222.

It is understood that the application of a positive or negative fluid pressure P1 by the device 312 may assist in reducing and/or substantially eliminating the formation of air bubbles within the various layers of adhesive 212, 214 included in the display 102. Any desired pressure P1 may be utilized in this process. For example, the device 312 may apply a positive pressure P1 between approximately 3 KgF/cm² and approximately 10 KgF/cm² in some display manufacturing processes. In further examples, the pressure P1 applied by the device 312 may be greater than approximately 10 KgF/cm². Additionally, the device 312 may be configured to apply such pressures P1 at any desired temperature and for any desired period of time. For example, the device 312 may be configured to apply any of the pressures P1 described herein at a temperature between approximately 20° C. and approximately 80° C., and the device 312 may apply such pressures and/or temperatures for a period of time between approximately 15 minutes and approximately 90 minutes. In further embodiments, the device 312 may apply such pressures and/or temperatures for a period of time greater than approximately 90 minutes. Further, it is understood that the application of, for example, relatively higher pressures may result in a reduction in the period of time required to, for example, adhere the first substrate 206 to the second substrate 222.

It is also understood that the substantially fluid-tight seal formed between the spacer 304A and the top surface C of the first substrate 206 may result in a second pressure P2 of air or other like fluids captured within the gap 306 that is different from the first pressure P1 applied by the device 312. Likewise, the substantially fluid-tight seal formed between the spacer 304B and the bottom surface F of the second substrate 222 may result in a second pressure P2 within the gap 310 that is different from the first pressure P1 applied by the device 312. For example, the second pressures P2 described herein may comprise atmospheric and/or ambient fluid pressures associated with air or other like fluids captured within the various gaps of the present disclosure while sealing the plates 302, 308 to the substrates 206, 222, and prior to the application of the first pressure P1 by the device 312. In such embodiments, for example, the second pressures P2 described herein may be less than the first pressures P1 applied by the device 312. Moreover, the second pressure P2 of air or other like fluids within at least one of the gaps 306, 310 may remain substantially constant as the first pressure P1 is applied by the device 312. It is understood, however, that the second pressures P2 may be increased, decreased, and/or otherwise modified or controlled relative to ambient pressure in some embodiments. Additionally, in embodiments in which the device 312 comprises a vacuum chamber or other like device configured to apply a negative pressure P1, the second pressures P2 of air or other fluids within the gaps 306, 310 may be greater than the first pressure P1 applied by the device 312.

In example embodiments of the present disclosure, the positions, dimensions, shapes, sizes, and/or other configurations associated with the components of the fixture 300 may be tuned to apply the first pressure P1 applied by the device 312 to any desired location on the first substrate 206 and/or on the second substrate 222. Applying the first pressure P1 in this way may improve adhesion of the first substrate 206 to the second substrate 222. In particular, applying the first pressure P1 to desired locations on the first substrate 206 and/or the second substrate 222 may assist in adhering portions of the substrates 206, 222 that are otherwise difficult to adhere using the device 312 alone. For example, in the configuration described above with respect to FIGS. 3 and 4, the first plate 302, and in particular the spacer 304A, may apply the first pressure P1 proximate the perimeter H of the top surface C. Likewise, the second plate 308, and in particular the spacer 304B, may apply the first pressure P1 proximate the perimeter J of the bottom surface F. In this way, the spacers 304A, 304B may apply a localized pressure P1 proximate the perimeters H, J to assist in adhering, for example, the perimeter K of the bottom surface D to the perimeter L of the top surface E. Applying localized pressures P1 in this way may improve adhesion at the perimeters K, L of the surfaces D, E. As noted herein, the spacers 304A, 304B may apply the pressure P1 to areas at which the spacers 304A, 304B contact the surfaces C, F of the respective substrates 206, 222.

In some embodiments, the amount of pressure P1 applied at various locations on one or more of the substrates 206, 222 can be controlled by modifying the amount of surface area at which the spacers 304A, 304B, and or other spacers described herein, contact the surfaces C, F. For example, the amount of force applied to the substrates 206, 222 can be desirably increased or decreased by changing the size, shape, durometer, material, and/or other configuration of a corresponding spacer 304A, 304B contacting a respective surface C, F of the substrate 206, 222. Such a change in spacer configuration may result in a corresponding change in the amount of surface area at which the spacers 304A, 304B contact the surfaces C, F, and this change in contact area will result in a commensurate change in the force applied by the respective spacer 304A, 304B. For example, in some embodiments, the force applied to a surface C, F of a respective substrate 206, 222 may be defined by the following equation:

$$(P1-P2)(SA1)/SA2=F$$

where F is the force applied to a surface of a substrate (e.g., top surface C of the first substrate 206), SA1 is the surface area of a surface (e.g., surface G) of a plate (e.g., first plate 302) at least partially defining a corresponding gap (e.g., gap 306), and SA2 is the surface area of physical contact between a spacer (e.g., spacer 304A) and the surface (e.g., top surface C) of the substrate (e.g., first substrate 206) to which the spacer is sealed. For example, SA1 may be the entire surface area of the surface G disposed within and/or at least partially defining the gap 306.

Figure 5:
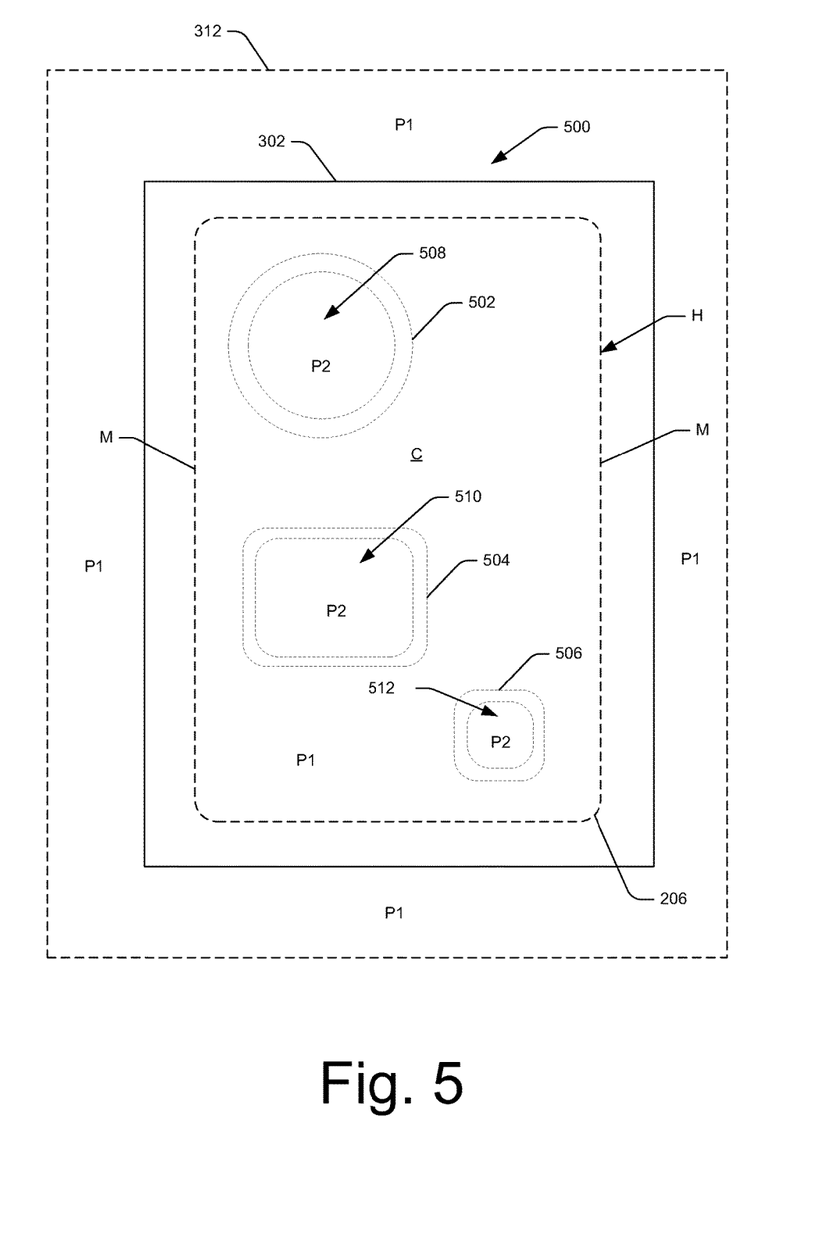
FIG. 5 illustrates an example plan view of a portion of another display.
Figure 6:
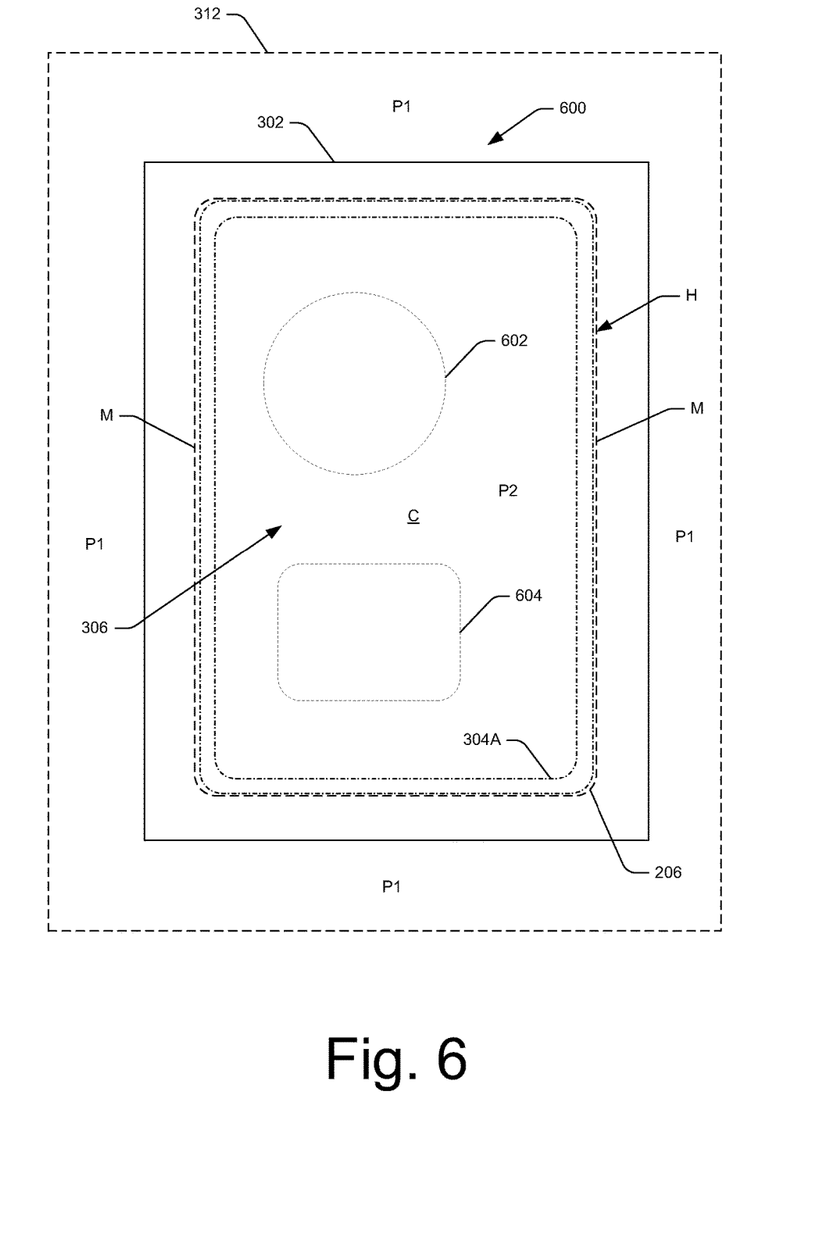
FIG. 6 illustrates an example plan view of a portion of yet another display.

FIGS. 5 and 6 illustrate additional example fixtures 500, 600 in which a localized pressure P1 may be applied to various locations on a substrate, such as the first substrate 206. It is understood that although only the first substrate 206 is illustrated in FIGS. 5 and 6, in further embodiments, substantially similar fixtures 500, 600 may be used in association with the second substrate 222.

As shown in FIG. 5, an example, fixture 500 may include a plurality of spacers 502, 504, 506 extending therefrom. The spacers 502, 504, 506 may be substantially similar to the spacers 304A, 304B described above with respect to FIG. 3. In the embodiment of FIG. 5, the various spacers 502, 504, 506 may have any known shape (i.e., circular, rectangular, square, etc.), size, location, durometer, and/or other configuration. Such spacers 502, 504, 506 may be connected to and/or may extend from at least one of the surface G of the first plate 302 or the surface I of the second plate 308 (FIG. 3). Additionally, such spacers 502, 504, 506 may form a substantially fluid-tight seal with the top surface C of the first substrate 206 and/or with the bottom surface F of the second substrate 222 (FIG. 3).

By employing the multiple spacers 502, 504, 506 shown in FIG. 5, the fixture 500 may be configured to apply localized pressure PI at various desired locations, and in the manner described above with respect to the spacers 304A, 304B. As shown in FIG. 5, such locations may be on, for example, the top surface C of the first substrate 206. Additionally or alternatively, such locations may be on, for example, the bottom surface F of the second substrate 222 (FIG. 3). In particular, the spacers 502, 504, 506 may apply the pressure P1 at the surface area at which the spacers 502, 504, 506 contact the respective surface (i.e., the top surface C and/or the bottom surface F) of the substrate to which the spacers 502, 504, 506 are sealed.

Each of the spacers 502, 504, 506 may define and/or otherwise form at least part of a respective sealed region or gap 508, 510, 512 that is substantially enclosed by the respective spacer 502, 504, 506. For example, each gap 508, 510, 512 may include air and/or any other fluid captured as the respective spacer 502, 504, 506 is sealed to the top surface C. The air captured within each gap 508, 510, 512 may be at, for example, the second pressure P2 described herein. Additionally, as shown in FIG. 5, at least one of the spacers 502, 504, 506 may be mutually exclusive. For example, the spacer 502 may be disposed on the surface G of the first plate 302 outside of the spacers 504, 506. Likewise, the spacer 504 may be disposed on the surface G outside of the spacers 502, 506. Although the spacer 304A has been omitted from FIG. 5 for clarity, in further embodiments, a spacer 304A as shown in FIG. 4 may be included on the surface G. In such an embodiment, at least one of the spacers 502, 504, 506 may be disposed on the surface G outside of the spacer 304A. Alternatively, in such embodiments, at least one of the spacers 502, 504, 506 may be disposed on the surface G such that the at least one spacer 502, 504, 506 is surrounded by and/or substantially enclosed by the spacer 304A between the surface G and the top surface C of the first substrate 206. Additionally, one or more of the sealed regions or gaps 508, 510, 512 may include air and/or other fluids at a pressure different from the first pressure P1 and/or the second pressure P2 described herein. For example, the pressure of fluid captured within at least one of the gaps 508, 510, 512 may be different from the pressure P2 of fluid captured within the gap 306 defined at least partially by the spacer 304A.

FIG. 6 illustrates an example fixture 600 including a plurality of substantially solid spacers 602, 604 connected to and/or otherwise extending from the first plate 302. The spacers 602, 604 may be substantially similar to the spacers 502, 504, 506 described above with respect to FIG. 5 except that at least one of the spacers 602, 604 may be substantially solid in nature and, thus, may not define a sealed region or gap within which air or other like fluids may be captured. In the embodiment of FIG. 6, the various spacers 602, 604 may have any known shape (i.e., circular, rectangular, square, etc.), size, location, durometer, and/or other configuration. Such spacers 602, 604 may be connected to and/or may extend from at least one of the surface G of the first plate 302 or the surface I of the second plate 308 (FIG. 3). Additionally, such spacers 602, 604 may form a substantially fluid-tight seal with the top surface C of the first substrate 206 or with the bottom surface F of the second substrate 222 (FIG. 3).

By employing the multiple spacers 602, 604 shown in FIG. 6, the fixture 600 may be configured to apply localized pressure PI at various desired locations, and in a manner similar to that described above with respect to the spacers 304A, 304B. As shown in FIG. 6, such locations may be on, for example, the top surface C of the first substrate 206. Additionally or alternatively, such locations may be on, for example, the bottom surface F of the second substrate 222 (FIG. 3). In particular, the spacers 602, 604 may apply the pressure P1 at the surface area at which the spacers 602, 604 contact the respective surface (i.e., the top surface C and/or the bottom surface F) of the substrate to which the spacers 602, 604 are sealed.

Further, at least one of the spacers 602, 604 may be disposed on the surface G of the first plate 302 inside of (i.e, surrounded by and/or enclosed by) the spacer 304A between the surface G and the top surface C of the first substrate 206. In such embodiments, the spacers 602, 604 may be disposed within the sealed region or gap 306 that it at least partially defined by the spacer 304A. Accordingly, the air and/or other fluids captured within the gap 306 but outside of the spacers 602, 604 may be at the second fluid pressure P2. However, the spacers 602, 604, as well as the spacer 304A, may apply the pressure P1 at the surface area at which the spacers 602, 604 contact, for example, the top surface C of the first substrate 206.

Figure 7:
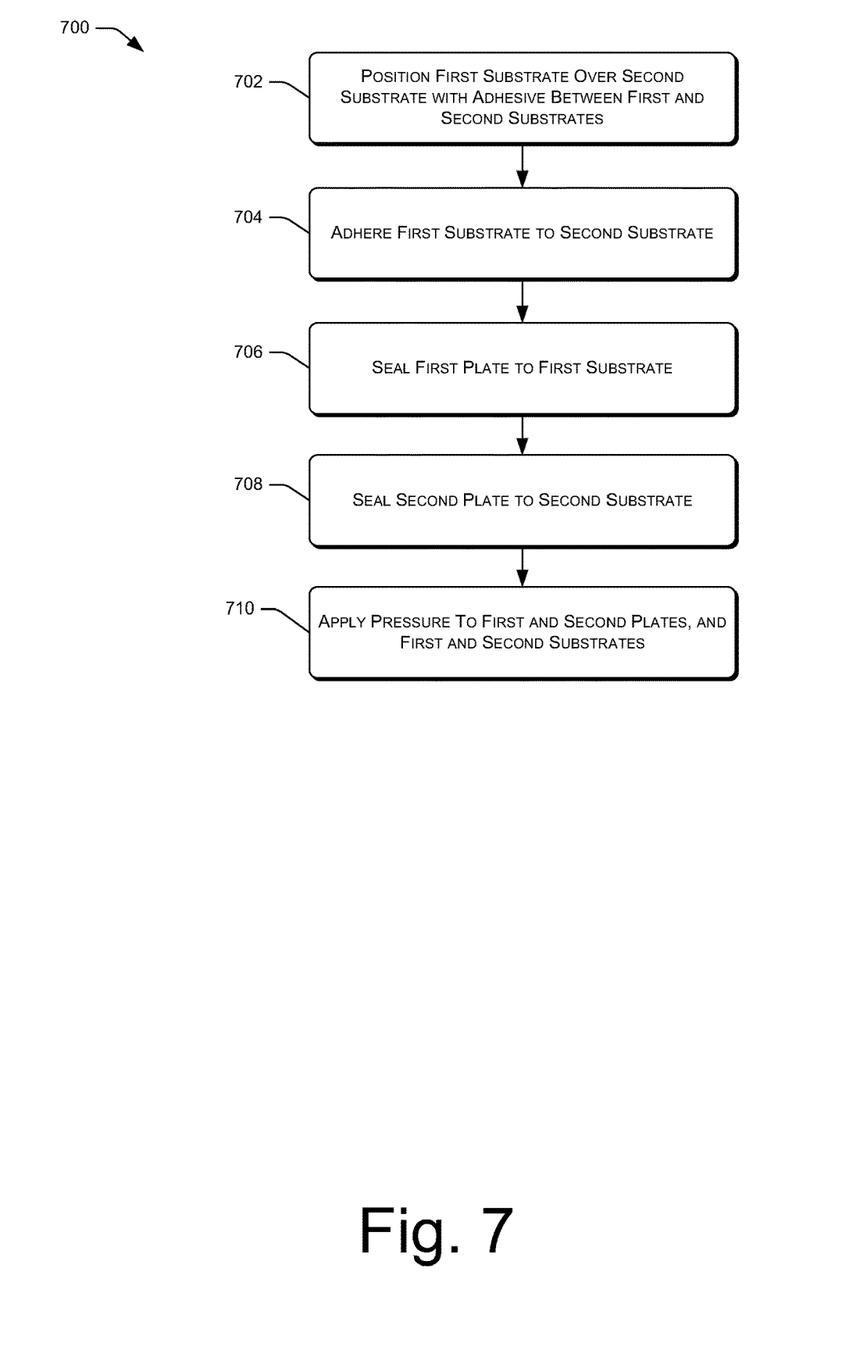
FIG. 7 shows a flow diagram illustrating an example method of manufacturing a display of an electronic device.

FIG. 7 illustrates an example method 700 of assembling and/or otherwise manufacturing an example display 102 of an electronic device 100. The order in which the operations are described is not intended to be construed as a limitation, and any number of the described operations can be combined in any order and/or in parallel to implement the process. Further, the process of orienting and/or otherwise disposing any of the components described above in their relative disclosed orientations may be incorporated into any of the operations illustrated in the method 700.

The method 700 includes, at 702, positioning a first substrate 206 over and/or proximate a second substrate 222, and disposing adhesive 214 between the first and second substrates 206, 222. For instance, at 702 the first substrate 206 may be positioned such that the lower or bottom surface D of the first substrate 206 faces the upper or top surface E of the second substrate 222. Additionally, at 702 the adhesive 214 may be disposed directly on at least one of the first substrate 206 or the second substrate 222, such as on the bottom surface D of the first substrate 206 and/or on the top surface E of the second substrate 222.

At 704, the first substrate 206 may be mated with and/or otherwise connected to the second substrate 222 such that the adhesive 214 may adhere the first substrate 206 to the second substrate 222. In at 704, the first substrate 206 may also be aligned with the second substrate 222 in any desired manner so that the mated substrates are adhered in desired positions relative to each other. For example, at 704, the first and second substrates 206, 222 may be aligned such that the perimeter K of the bottom surface D is substantially spatially aligned with and/or substantially overlapping the corresponding perimeter L of the top surface E. In such embodiments, it is understood that the first substrate 206 may have substantially the same shape, size, and/or configuration as the second substrate 222.

The method 700 also includes, at 706, sealing the first plate 302 to the first substrate 206. For example, at 706, the first plate 302 may be sealed to the top surface C of the first substrate 206, proximate, adjacent to, and/or substantially overlapping the perimeter H of the top surface C. As noted above, in example embodiments the first plate 302 may include a substantially flexible spacer 304A, and in such embodiments, sealing the first plate 302 to the first substrate 206 may include forming a substantially fluid-tight seal between the spacer 304A and the top surface C of the first substrate 206. In example embodiments, the first plate 302 may be positioned relative to the first substrate 206 such that the spacer 304A extends proximate, adjacent to, and/or substantially overlapping the perimeter H of the top surface C of the first substrate 206.

In example embodiments, sealing the first plate 302 to the first substrate 206 at 706 may result in a gap 306 being formed between the first plate 302 and the top surface C of the first substrate 206. For example, the gap 306 may be defined and/or otherwise formed, at least in part, by the surface G of the first plate 302 and the top surface C of the first substrate 206. In some embodiments, formation of the gap 306 between the first plate 302 and the first substrate 206 may occur as a result of sealing the first plate 302 to the first substrate 206. Additionally, in example embodiments the gap 306 may be defined and/or otherwise formed, at least in part, by one or more surfaces of the spacer 304A. In such embodiments, such example surfaces of the spacer 304A may include one or more inwardly facing surfaces of the spacer 304A. It is understood that the spacer 304A may space the first plate 302 from the top surface C to at least partially define the gap 306.

At 708, the second plate 308 may be sealed to the second substrate 222. For example, at 708 the second plate 308 may be sealed to the bottom surface F of the second substrate 222, proximate, adjacent to, and/or substantially overlapping the perimeter J of the bottom surface F. Additionally, in example embodiments the second plate 308 may include a substantially flexible spacer 304B, and in such embodiments, sealing the second plate 308 to the second substrate 222 may include forming a substantially fluid-tight seal between the spacer 304B and the bottom surface F of the second substrate 222. In example embodiments, the second plate 308 may be positioned relative to the second substrate 222 such that the spacer 304B extends proximate, adjacent to, and/or substantially overlapping the perimeter J of the bottom surface F of the second substrate 222.

In example embodiments, sealing the second plate 308 to the second substrate 222 at 708 may result in a gap 310 being formed between the second plate 308 and the bottom surface F of the first substrate 206. For example, the gap 310 may be defined and/or otherwise formed, at least in part, by the surface I of the second plate 308 and the bottom surface F of the second substrate 222. In some embodiments, formation of the gap 310 between the second plate 308 and the second substrate 222 may occur as a result of sealing the second plate 308 to the second substrate 222. Additionally, in example embodiments the gap 310 may be defined and/or otherwise formed, at least in part, by one or more surfaces of the spacer 304B. In such embodiments, such example surfaces of the spacer 304B may include one or more inwardly facing surfaces of the spacer 304B. It is understood that the spacer 304B may space the second plate 308 from the bottom surface F to at least partially define the gap 310.

At 710, a first pressure P1 may be applied to the first plate 302, the second plate 308, and at least a portion of the first and second substrates 206, 222. As noted above, the first pressure P1 may be applied by an autoclave, a vacuum chamber, or other like device 312. In such embodiments, the first pressure P1 may be greater than or less than ambient pressure as desired. Additionally, in such embodiments, the first pressure P1 may be applied substantially uniformly to the first plate 302, the second plate 308, and to at least a portion of the first and second substrates 206, 222 by the device 312. In example embodiments, the first pressure P1 may be between approximately 3 $KgF/cm^2$ and approximately 10 $KgF/cm^2$, and in some embodiments, the first pressure P1 may be increased, decreased, held constant, and/or otherwise modified or controlled in order to assist in removing, for example, air bubbles from a layer of optically clear adhesive 214. For example, methods of the present disclosure may include adhering the first substrate 206 to the second substrate 222 with an adhesive, such as the optically clear adhesive 214 described above, disposed between the first and second substrates 206, 222. Additionally, the first pressure P1 may be applied at any temperature and for any desired period of time. For example, the pressure P1 may be applied at a temperature between approximately 20° C. and approximately 80° C., for between approximately 15 minutes and approximately 90 minutes.

Moreover, it is understood that as the first pressure P1 is applied at 710, the first pressure P1 may be applied proximate, adjacent to, and/or overlapping substantially the entire perimeter H of the top surface C via the first plate 302, and may also be applied proximate, adjacent to, and/or overlapping substantially the entire perimeter J of the bottom surface F via the second plate 308. In particular, the first pressure P1 may be applied proximate, adjacent to, and/or overlapping substantially the entire perimeter H via the spacer 304A, and the first pressure P1 may be applied proximate, adjacent to, and/or overlapping substantially the entire perimeter J via the spacer 304B. In such example embodiments, the first pressure P1 may be applied to the area on the top surface C in contact with the spacer 304A, and this area of the top surface C may be along, proximate, adjacent to, and/or overlapping substantially the entire perimeter H of the top surface C, such as at the edges of the top surface C. Likewise, the first pressure P1 may be applied to the area on the bottom surface F in contact with the spacer 304B, and this area of the bottom surface F may be along, proximate, adjacent to, and/or overlapping substantially the entire perimeter J of the bottom surface F, such as proximate the edges of the bottom surface F. Additionally, at 710 a second pressure P2, such as a fluid pressure of air captured within at least one of the gaps 306, 310, may remain substantially constant as the first pressure P1 is applied. For example, due to the substantially fluid-tight seal formed between the spacer 304A and the first substrate 206, as well as the substantially fluid-tight seal formed between the spacer 304B and the second substrate 222, the second pressure P2 (i.e., the fluid pressure of air captured within the respective gaps 306, 310) may be unaffected by the application of the first pressure P1. In this way, the first pressure P1 may be increased, decreased, and/or modified at 710 while the second pressure P2 within the respective gaps 306, 310 may be maintained substantially constant. As a result, for example, the localized first pressure P1 applied to the area on the top and bottom surfaces C, F in contact with the respective spacers 304A, 304B proximate the perimeters H, J may be greater than the second pressure P2 within the respective gaps 306, 310. This difference in pressure may, for example, facilitate and/or improve adhesion of the perimeter J (of the bottom surface D) to the perimeter L (of the top surface D).

With reference to the example device 100 shown in FIG. 1, the display 102 may represent a reflective display in some instances, such as an electronic paper display, a reflective LCD display or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display.

In one implementation, the display 102 comprises an electrophoretic display that moves particles between different positions to achieve different color shades. For instance, in an embodiment in which the display 102 is free from a color filter, the display 102 may be configured to produce the color white when the particles within a component of the display 102 are located at the front (i.e., viewing) side of the display. For example, particles of the display 102 may be associated with and/or may otherwise correspond to an individual "pixel" of the display 102, and each pixel may be controlled individually to produce a desired color at the pixel. In the above example, when particles of a given pixel are located at the front side of the display 102, the particles reflect incident light, thus giving the appearance of a white pixel. Conversely, when the particles are pushed near the rear of the display, the particles absorb the incident light and, hence, cause the pixel to appear black to a viewing user. For example, when such particles are pushed near the rear of the display, a non-transparent oil or other like substance in which the particles are immersed may assist in absorbing the incident light and, hence, cause the corresponding pixel to appear black. In addition, the particle may situate at varying locations between the front and rear sides of the display to produce varying shades of gray. Furthermore, as used herein, a "white" pixel may comprise any shade of white or off white, while a "black" pixel may similarly comprise any shade of black.

In another implementation, the display 102 comprises an electrophoretic display that includes oppositely charged light and dark particles. In order to create a white pixel, the display controller 104 may move the light particles to the front side of the display 102 by creating a corresponding charge at an electrode node near the front and moves the dark particles to the back of the display 102 by creating a corresponding charge at an electrode node near the back of the display 102. In order to create black, meanwhile, the display controller 104 changes the polarities and moves the dark particles to the front and the light particles to the back. Furthermore, to create varying shades of gray, the display controller 104 may utilize different arrays of both light and dark particles.

In still another implementation, the display 102 comprises an electrowetting display that employs an applied voltage to change the surface tension of a liquid in relation to a surface. For instance, by applying a voltage to a hydrophobic surface, the wetting properties of the surface can be modified so that the surface becomes increasingly hydrophilic. As one example of an electrowetting display, the modification of the surface tension acts as an optical switch by contracting a colored oil film when a voltage is applied to individual pixels of the display. When the voltage is absent, the colored oil forms a continuous film within a pixel, and the color may thus be visible to a user of the display. On the other hand, when the voltage is applied to the pixel, the colored oil is displaced and the pixel becomes transparent. When multiple pixels of the display are independently activated, the display 102 can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content. In addition, the lower power consumption of electrowetting displays in comparison to conventional LCD displays makes the technology suitable for displaying content on portable devices that rely on battery power.

While several different examples have been given, it is to be appreciated that the displays 102 described herein may comprise any other type of electronic-paper technology or reflective-display technology, such as gyricon displays, electrowetting displays, electrofluidic displays, interferometric modulator displays, cholestric liquid crystal displays, and the like. In addition, while some of the examples described above are discussed as rendering black, white, and varying shades of gray, it is to be appreciated that the described techniques apply equally to displays capable of rendering color pixels. As such, the terms "white", "gray", and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter.

In addition to the display 102, FIG. 1 illustrates that the device 100 may include a touch sensor 106 and a touch controller 108. In some instances, at least one touch sensor 106 resides beneath the display 102 to form a touch-sensitive display (e.g., an electronic paper touch-sensitive display) that is capable of both accepting touch input from a user of the electronic device 100 and rendering content corresponding to the input. In an example embodiment, the touch sensor 106 may reside on a conductive substrate or other like layer of conductive material included in the display 102, and the layer of conductive material and the touch sensor 106 may be spaced from the user by various components of the display 102.

The touch sensor 106 may comprise a capacitive touch sensor, a force sensitive resistance (FSR) sensor, an interpolating force sensitive resistance (IFSR) sensor, or any other type of touch sensor. In some instances, the touch sensor 106 is capable of detecting touches as well as determining an amount of pressure or force of these touches. In example embodiments, the touch sensor 106 may comprise a capacitive touch sensor. In such embodiments, the touch sensor 106 may direct signals including information indicative of such touches and/or indicative of the amount of pressure or force of such touches to the touch controller 108. The touch controller 108 may communicate and/or otherwise cooperate with the display controller 104 to assist in rendering content corresponding to the touch input.

FIG. 1 further illustrates that the electronic device 100 includes one or more processors 110 and a memory comprising computer-readable media 112. The electronic device 100 may also include one or more of a front light 114 for lighting the display 102, an antiglare component 116 for reducing glare of incident light, one or more network interfaces 118, and one or more power sources 120. The network interfaces 118 may support both wired and wireless connection to various networks, such as cellular networks, internet, radio, WiFi® networks, short range networks (e.g., Bluetooth®), infrared, and so forth.

Depending on the configuration of the electronic device 100, the computer-readable media 112 (and other computer-readable media described throughout) is an example of computer storage media and may include volatile and non-volatile memory. Thus, the computer-readable media 112 may include, but is not limited to, RAM, ROM, EEPROM, flash memory, or other memory technology, or any other medium which can be used to store media items or applications and data which can be accessed by the electronic device 100.

The computer-readable media 112 may be used to store any number of functional components that are executable on the processors 110, as well content items 122 and applications 124. Thus, the computer-readable media 112 may include an operating system and a storage database to store one or more content items, such as eBooks, audio books, songs, videos, still images, and the like. The computer-readable media 112 of the electronic device 100 may also store one or more content presentation applications to render content items on the device 100. These content presentation applications may be implemented as various applications depending upon the content items. For instance, the application may be an electronic book reader application for rending textual electronic books, an audio player for playing audio books or songs, a video player for playing video, and so forth.

In some instances, the electronic device 100 may couple to a cover (not shown) to protect the display 102 (and other components in the stack) of the device 100. In one example, the cover may include a back flap that covers a back portion of the device 100 and a front flap that covers the display 102 and the other components in the stack. The device 100 and/or the cover may include a sensor (e.g., a hall effect sensor) to detect when the cover is open (i.e., when the front flap is not atop the display and other components). The sensor may send a signal to the front light 114 when the cover is open and, in response, the front light 114 may illuminate the display 102. When the cover is closed, meanwhile, the front light 114 may receive a signal indicating that the cover has closed and, in response, the front light 114 may turn off.

As described above, the touch sensor 106 may comprise a capacitive touch sensor that resides beneath various components of the display 102. The front light 114, meanwhile, may reside atop or beneath the capacitive touch sensor 106. In some instances, the front light 114 couples to a top surface of the capacitive touch sensor 106 via optically clear adhesive, pressure-sensitive adhesive and/or other types of adhesive (collectively "adhesive"). In the latter instances, the device 100 may be assembled by placing the adhesive atop the touch sensor 106 and, when the adhesive reaches the corner(s) and/or at least a portion of the perimeter of the touch sensor 106, UV-curing the adhesive on the corners and/or the portion of the perimeter. Thereafter, the remaining adhesive may be UV-cured and the front light 114 may couple to the OCA. By first curing the corner(s) and/or perimeter, the techniques effectively create a barrier for the remaining adhesive and also prevent the formation of air gaps in the adhesive layer, thereby increasing the efficacy of the front light 114 and/or other components of the display 102. In other implementations, the adhesive may be placed near a center of the top surface of the touch sensor 106, pressed outwards towards a perimeter of the top surface of the touch sensor 106 and cured. It is understood that like techniques may also be utilized for connecting any of the other components of the display 102 described herein using adhesive.

As illustrated, the front light 114 includes a lightguide 126 and a light source 128. The lightguide 126 comprises a substrate (e.g., a transparent thermoplastic such as PMMA), a layer of lacquer and multiple grating elements 130 that function to propagate light from the light source 128 towards the display 102, thus illuminating the display 102. To create the grating elements, the layer of lacquer may be applied to the substrate of the lightguide 126, the grating elements may be embossed to the layer of lacquer, and the lightguide 126 may be UV-cured. Alternatively, the substrate of the lightguide and the grating elements may be manufactured as a single element, such as via an injection molding process.

The light source 128 may comprise one or more (e.g., four) LEDs, which may reside toward a bottom edge of the electronic device. By positioning the LEDs along the bottom portion of the display 102 relative to the content being displayed, light from the light source 128 is generally directed away from a user consuming the content and, hence, is not directed into the user's eyes. That is, because users typically hold the device 100 with the top edge further away from the user's eyes than the bottom edge (i.e., with the top edge tilted away from the user, given the user's line of sight to the top edge), the LEDs positioned on the bottom of the display 102 will generally shine towards the top edge and away from the user's eyes. As such, positioning the LEDs in this manner may decrease the chances of the light being directed into a user's eyes.

The antiglare component 116 may comprise a film that functions to reduce glare of ambient light incident on the electronic device 100. In some instances, the antiglare component 116 may comprise a hard-coated polyester and polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3 h pencil). Without such scratch resistance, the display 102 may be more easily scratched and a user may perceive the scratches from the light that is dispersed over the top of the display 102. The antiglare component 116 may couple to a top surface of the display 102 via OCA. The antiglare component 116 may, in some instances, also include a UV filter for the purpose of protecting components lower in the stack of the display 102 from UV of the light incident on the electronic device 100. In still further embodiments, the antiglare component 116 may be omitted, and instead, one or more surfaces of the display 102 may be etched, chemically treated, and/or otherwise processed to provide reduce glare of ambient light incident on the display 102 and/or to otherwise provide antiglare functionality.

While FIG. 1 illustrates various example components, the electronic device 100 may have additional features or functionality. For example, the device 100 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 100 may reside remotely from the device 100 in some implementations. In these implementations, the device 100 may utilize the network interfaces 118 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A display for an electronic device, comprising:
   a first substantially rigid plate including a continuous, substantially planar bottom surface, the bottom surface having
      a width extending from a first end of the first plate to a second end of the first plate opposite the first end, and
      a length greater than the width;
   a first substrate having a first surface and a second surface opposite the first surface, wherein the bottom surface faces the first surface of the first substrate;
   a first substantially flexible spacer sealed to the first surface of the first substrate and extending from the first surface of the first substrate to the bottom surface, the first spacer defining at least part of a first gap extending from the bottom surface to the first surface of the first substrate;
   a second substantially rigid plate having a second substantially flexible spacer extending therefrom;
   a second substrate having a first surface and a second surface opposite the first surface of the second substrate, the second surface of the first substrate facing the second surface of the second substrate;
   a substantially transparent conductive layer, comprising a common electrode of the display, disposed between the second surface of the first substrate and the second surface of the second substrate; and
   a third spacer sealed to one of the first surface of the first substrate or the first surface of the second substrate, wherein;
      the third spacer is disposed at a substantially central location on the one of the first surface or the second surface, and is surrounded by one of the first spacer or the second spacer,
      the second spacer is sealed to the first surface of the second substrate, the second spacer forming at least part of a second gap extending from the second plate to the first surface of the second substrate,
      at least one of the first gap or the second gap maintaining a fluid disposed within the at least one of the first gap or the second gap at a substantially ambient pressure as a pressure different from the substantially ambient pressure is applied to the first plate, the second plate, and at least a portion of the first and second substrates.

2. The display of claim 1, wherein the first spacer is positioned adjacent to a perimeter of the first surface of the first substrate.

3. The display of claim 1, wherein the third spacer defines at least part of a third gap at the substantially central location, and wherein the third gap includes air.

4. The display of claim 1, the third spacer applying a first pressure at the substantially central location as the pressure different from the substantially ambient pressure is applied, wherein
   the substantially transparent conductive layer is disposed on the second surface of the first substrate or the second surface of the second substrate, and
   a portion of the second surface of the first substrate, aligned with the substantially central location, is sealed to a portion of the second surface of the second substrate aligned with the substantially central location.

5. The display of claim 1, wherein the first plate comprises a first substantially rigid material, and wherein the first spacer comprises a second material different from the first substantially rigid material.

6. The display of claim 4, wherein air disposed within the at least one of the first and second gaps, and between the third spacer and the one of the first spacer or the second spacer, is at a second pressure different from the first pressure.

7. A display for an electronic device, comprising:
   a first substrate having an upper surface and an opposing lower surface;
   a second substrate having an upper surface and an opposing lower surface;
   a first plate having a first spacer attached to a surface of the first plate;
   a second plate having a second spacer attached to a surface of the second plate, wherein
      the first spacer, a portion of the surface of the first plate, and a portion of the upper surface of the first substrate together define a first sealed region, wherein the first plate comprises a first substantially rigid material, and wherein the first spacer comprises a second material different from the first substantially rigid material, the second spacer, a portion of the surface of the second plate, and a portion of the lower surface of the second substrate together define a second sealed region, and the first substrate is positioned such that the lower surface of the first substrate faces the upper surface of the second substrate;

a third spacer sealed to one of the upper surface of the first substrate or the lower surface of the second substrate, wherein the third spacer is disposed at a substantially central location on the one of the upper surface of the first substrate or the lower surface of the second substrate; and a substantially transparent conductive layer, comprising a common electrode of the display, disposed between the lower surface of the first substrate and the upper surface of the second substrate;

an adhesive adhering the first substrate to the second substrate, the adhesive being disposed between the lower surface of the first substrate and the upper surface of the second substrate.

8. The display of claim 7, wherein the upper surface of the first substrate, the lower surface of the first substrate, the upper surface of the second substrate, and the lower surface of the second substrate comprise substantially planar surfaces, and wherein at least one of the first and second spacers comprises a substantially flexible spacer.

9. The display of claim 7, wherein the adhesive is disposed along substantially an entirety of the lower surface of the first substrate and along substantially an entirety of the upper surface of the second substrate.

10. The display of claim 7, wherein the third spacer defines at least part of a third sealed region, and wherein the third sealed region includes air.

11. The display of claim 10, wherein a pressure within the first and second sealed regions is substantially equal to a pressure within the third sealed region.

12. The display of claim 7, wherein the first plate is positioned such that the first spacer extends proximate substantially an entire perimeter of the upper surface of the first substrate; and the second plate is positioned such that the second spacer extends proximate substantially an entire perimeter of the lower surface of the second substrate.

13. The display of claim 7, wherein a pressure within the first sealed region is substantially equal to a pressure within the second sealed region.

14. The display of claim 7, wherein the third spacer comprises a substantially solid spacer applying a first pressure at the substantially central location.

15. The display of claim 14, wherein a fluid disposed within at least one of the first and second sealed regions is at a second pressure different from the first pressure.

16. An assembly, comprising:
a first substantially planar substrate having an upper surface and a lower surface opposite the upper surface;
a second substantially planar substrate disposed opposite the first substrate, the second substrate having an upper surface and a lower surface opposite the upper surface;
an adhesive disposed between the lower surface of the first substrate and the upper surface of the second substrate, the adhesive adhering the lower surface of the first substrate to the upper surface of the second substrate;
a first substantially rigid plate including a continuous, substantially planar bottom surface, the bottom surface having
a width extending from a first end of the first plate to a second end of the first plate opposite the first end, and
a length greater than the width, wherein
the bottom surface faces the upper surface of the first substrate;
a first substantially flexible spacer extending from the upper surface of the first substrate to the bottom surface,
the first spacer, the bottom surface, and at least a portion of the upper surface of the first substrate defining a first sealed region;
a second plate;
a second spacer extending from a surface of the second plate, wherein the second spacer is sealed to the lower surface of the second substrate,
the second spacer, the surface of the second plate, and at least a portion of the lower surface of the second substrate defining a second sealed region, wherein the first and second sealed regions contain air at a substantially ambient pressure; and
a third spacer sealed to one of the upper surface of the first substrate or the lower surface of the second substrate, wherein the third spacer is
disposed at a substantially central location on the one of the upper surface of the first substrate or the lower surface of the second substrate.

17. The assembly of claim 16, wherein the adhesive comprises an optically clear adhesive.

18. The assembly of claim 16, wherein the third spacer defines at least part of a third sealed region surrounded by the third spacer, the third sealed region being disposed at the substantially central location and including air at the substantially ambient pressure.

19. The assembly of claim 16, wherein at least one of the first and second substrates is made from a substantially transparent material, and wherein the adhesive comprises an optically clear adhesive.

20. The assembly of claim 18, wherein:
the third spacer applies a first pressure at an area at which the third spacer contacts the one of the upper surface of the first substrate or the lower surface of the second substrate, and
a fluid disposed within at least one of the first and second sealed regions is at a second pressure different from the first pressure.

* * * * *